United States Patent
Walker, III

(10) Patent No.: US 8,451,984 B2
(45) Date of Patent: *May 28, 2013

(54) REMOTELY ACTUATED TWO-WAY SPEAKERPHONE FOR USE WITH CALL-FOR-HELP SYSTEMS

(76) Inventor: Ethan Allen Walker, III, Norman, OK (US)

(*) Notice: Subject to any disclaimer, the term of this patent is extended or adjusted under 35 U.S.C. 154(b) by 1205 days.

This patent is subject to a terminal disclaimer.

(21) Appl. No.: 12/180,178

(22) Filed: Jul. 25, 2008

(65) Prior Publication Data

US 2010/0020941 A1 Jan. 28, 2010

(51) Int. Cl.
| H04M 11/04 | (2006.01) |
| B61L 1/00 | (2006.01) |
| G08B 1/08 | (2006.01) |
| H04L 12/66 | (2006.01) |
| H04W 4/22 | (2009.01) |

(52) U.S. Cl.
CPC .......... H04M 11/04 (2013.01); B61L 1/00 (2013.01); G08B 1/08 (2013.01); H04L 12/66 (2013.01); H04W 4/22 (2013.01)
USPC ............ 379/38; 340/539.11; 340/539.13; 340/573.1; 340/574; 342/357.4; 342/357.75; 379/45; 379/202.01; 398/71; 705/2; 705/27.1; 715/718

(58) Field of Classification Search
CPC .......... H04M 11/04; H04L 12/66; H04W 4/22; B61L 1/00; G08B 1/08
USPC ............ 340/574, 539.11, 539.13, 573.1; 342/357.75, 357.4; 379/37, 38, 45, 202.01; 398/71; 455/404.1, 404.2, 420; 705/2, 27.1; 715/718
See application file for complete search history.

(56) References Cited

U.S. PATENT DOCUMENTS

| 5,003,294 | A | * | 3/1991 | Mason et al. | 340/574 |
| 5,202,666 | A | | 4/1993 | Knippscheer | |
| 5,450,064 | A | * | 9/1995 | Williams et al. | 340/574 |
| 5,661,779 | A | * | 8/1997 | Lee | 379/45 |
| 5,729,203 | A | * | 3/1998 | Oka et al. | 340/573.1 |
| 5,960,337 | A | * | 9/1999 | Brewster et al. | 455/404.2 |
| 5,963,631 | A | * | 10/1999 | Fazio et al. | 379/202.01 |
| 6,032,035 | A | * | 2/2000 | Webster et al. | 455/404.2 |
| 6,175,329 | B1 | * | 1/2001 | Vicci | 342/357.4 |
| 6,362,778 | B2 | * | 3/2002 | Neher | 342/357.75 |
| 6,765,992 | B2 | * | 7/2004 | Dawson | 379/38 |
| 7,139,549 | B2 | | 11/2006 | Islam et al. | |

(Continued)

Primary Examiner — Gerald Gauthier
(74) Attorney, Agent, or Firm — James F. Harvey, III

(57) ABSTRACT

A system and method for providing a call-for-help capability is provided by the invention. The system comprises a central location having a dedicated telephone line having a specified caller identification known to a speakerphone system located in the general location of a person who uses the system for emergency signaling. The person is provided with the speakerphone system and a pendent for generating an emergency signal containing the person's identifier. When received at the central location, a telephone number of the speakerphone system corresponding to the identifier is determined and a telephone call is made on a telephone channel having the specified caller identification. When any call is received by the speakerphone system, its caller identification is examined to determine if the caller identification of the telephone call is the same as the specified caller identification. If so, the telephone line is automatically made to go offhook and the call is directed to a speaker associated with the speakerphone system for hands-free operation. If not, the telephone receiver associated with the speakerphone system is allowed to ring-in in the normal way for manual activation by the person.

14 Claims, 5 Drawing Sheets

U.S. PATENT DOCUMENTS

| | | | |
|---|---|---|---|
| 7,171,187 B2 * | 1/2007 | Haave et al. | 455/404.2 |
| 7,185,282 B1 * | 2/2007 | Naidoo et al. | 715/718 |
| 7,231,200 B2 | 6/2007 | Jenkins | |
| 7,236,577 B2 | 6/2007 | Lection et al. | |
| 7,307,522 B2 * | 12/2007 | Dawson | 340/539.13 |
| 7,315,736 B2 | 1/2008 | Jenkins | |
| 7,395,215 B2 * | 7/2008 | Grushka | 705/2 |
| 7,461,012 B2 * | 12/2008 | Elberbaum | 705/27.1 |
| 7,526,269 B1 * | 4/2009 | Walker, III | 455/404.2 |
| 7,616,738 B2 * | 11/2009 | Baum et al. | 379/45 |
| 7,701,332 B2 * | 4/2010 | Anderson | 340/539.11 |
| 7,899,437 B2 * | 3/2011 | Baum | 455/404.1 |
| 7,933,581 B2 * | 4/2011 | Wijayanathan et al. | 455/404.2 |
| 8,121,588 B2 * | 2/2012 | Gottlieb | 455/420 |
| 8,265,587 B2 * | 9/2012 | D'Evelyn et al. | 455/404.1 |
| 2003/0169852 A1 * | 9/2003 | Otero | 379/37 |
| 2008/0279555 A1 * | 11/2008 | Horiuchi et al. | 398/71 |
| 2010/0020941 A1 * | 1/2010 | Walker, III | 379/38 |

\* cited by examiner

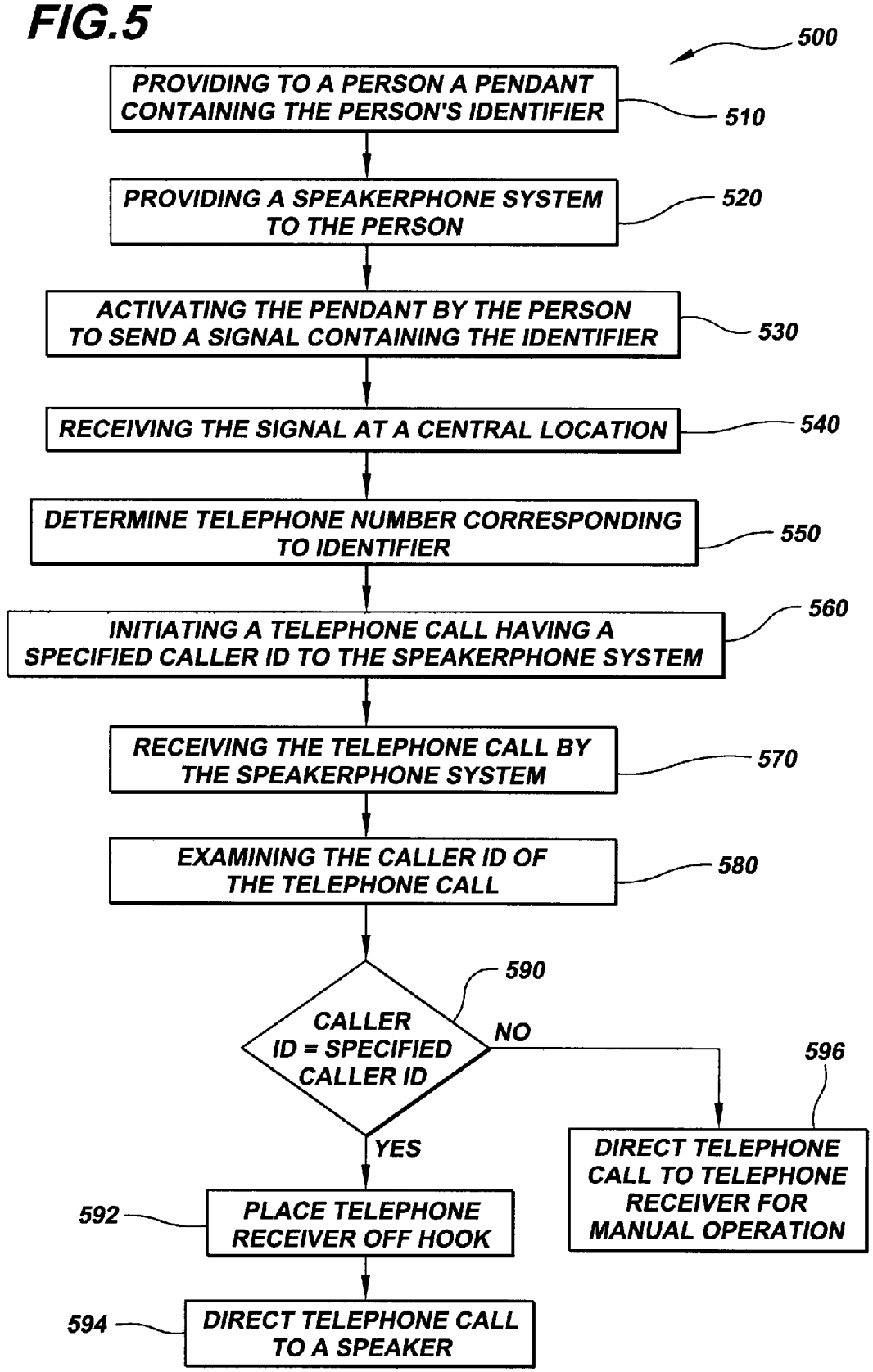

REMOTELY ACTUATED TWO-WAY SPEAKERPHONE FOR USE WITH CALL-FOR-HELP SYSTEMS

BACKGROUND OF THE INVENTION

The present invention generally relates to methods and devices for emergency calling, and more specifically, to the area of wireless call-for-help systems.

A call-for-help system is generally regarded as a communications system (normally a telephone that has been modified in some manner) used by a person to summon help when the person is in a situation in which that person is unable to either dial or conveniently access the call-to-help system. In general, there are two types of system architectures in use at the present time, an individual dialer box system architecture and a global wireless receiver system architecture. According to the individual dialer box system architecture, a dialer box responsive to a pendant is provided for each individual. The dialer box contains a radio frequency (RF) receiver and a speakerphone, and the pendant contains an RF transmitter. The RF receiver is configured to receive a signal from the pendant's RF transmitter, cause a speakerphone to go off-hook, and dial a preconfigured telephone number of a caregiver, such as an emergency response team or some central location. When the caregiver, party, or device at the other end answers, the caregiver can have a conversation with the caller by means of the hands-free speakerphone that is built into the dialer. The pendant may be carried by the person so that it may activate the RF receiver from the person's immediate location.

The hands-free speakerphone is important to the process because the person calling for help may be incapacitated and unable to pick up a standard phone set. However, a disadvantage of this type system is that transmitter only works in close proximity to the receiver/dialer. For persons confined to a small area, this may provide sufficient notification capability. However, if the person is capable of moving through various locations within a large area, then the person may move beyond the range of the transmitter and/or move beyond the range of the receiver/dialer.

A second type of system architecture, the global wireless receiver system architecture, may also be used to provide call-for-help capabilities. According to this system architecture, a network of RF receivers is incorporated throughout an area, or facility, in which the caller is located. This may allow a wireless transmitter to be activated anywhere in the facility by any pendant, as long as the receivers are placed in strategic locations to provide broad coverage throughout all areas of the facility. System architecture allows a signal from the caller's pendant to be received anywhere within the facility, and the caller's location can be determined from that signal. However, there is no possibility of a two-way voice communication since the signal is not associated with a telephone line; such system architectures employ either wireless repeaters positioned throughout the facility or else receivers attached to a central computer via RS-485 communications links, neither of which support voice links.

Another type of system architecture attempts to combine the best features of the previous two system architectures by placing a dedicated speakerphone in the person's apartment or residence, which responds to a call placed from a central location in receipt of a signal from the person's pendant. At the central location a determination is made of which pendant is issuing the signal and a caregiver dials in to the speakerphone, which automatically opens a line upon receipt of the call.

However, the problem with this arrangement is the criteria for selectively going off-hook. If the person is in a public area, then dedicated speakerphones could be employed to unconditionally go off-hook, but in the person's residence, other telephone devices, such as fax machines, voice answering machines, voice-mail services, and the like, may be connected with the incoming phone line. These devices typically employ a method of automatically going off-hook in response to incoming calls after a specified number of rings. In a residential application, the provision to have a hands-free speakerphone pick up after a designated number of rings may conflict with these other devices that are also programmed to answer after a specified number rings. Some systems have tried to overcome this limitation by employing a separate RF signal issued from the central location, which causes the speakerphone to go off-hook by remote command. However, this adds cost and complexity to the speakerphone device.

As can be seen, there is a need for a method and system to provide a hands-free speakerphone capability that identifies and responds to an incoming call made by a emergency caregiver while at the same time allowing other telephone devices to be used on the same telephone line.

SUMMARY OF THE INVENTION

A method is provided for initiating and responding to an emergency, the method comprising the following steps: activating an emergency call transmitter by a person to send an emergency signal to a central computer for processing, the central computer having a dedicated telephone line originating at the central computer, the dedicated telephone line having a unique caller identification; initiating a call by the central computer in response to the emergency signal to a hands-free speakerphone accessible to the person, the call being made on the dedicated telephone line; detecting the call with its associated caller identification by a hands-free emergency speakerphone adapted to respond to the caller identification of the dedicated telephone line; activating the hands-free speakerphone in response to detection of the caller identification of the dedicated telephone line; and opening a two-way voice path between the hands-free speakerphone and a caregiver on the dedicated telephone line.

These and other features, aspects, and advantages of the present invention will become better understood with reference to the following drawings, description, and claims.

BRIEF DESCRIPTION OF THE DRAWINGS

FIG. 5 shows a flowchart of the actions that are taken in order to initiate and respond to an emergency signal, according to an embodiment of the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the current invention provides systems, devices, and methods that allow a caregiver or attendant at a central location to call a two-way, hands-free speakerphone at the location of a person who has activated an emergency transmitter. The invention may provide a two-way, hands-free speakerphone designed to allow the caregiver to call a designated two-way speakerphone and have the speakerphone go offhook automatically. The speakerphone may do this by detecting a caller identification (Caller ID) message accompanying the caregiver's telephone call, i.e. a generated string of characters that identifies the caregiver. The caregiver would always use a designated telephone line that has been installed specifically for this purpose so that the same caller ID would be presented for all such responsive calls. In this manner, the hands-free speakerphone may identify an incoming call as that of the caregiver and respond by opening up a two-way telephone conversation.

The invention may combine the best features of the dialer box system architecture and the global wireless receiver system architecture. According to the invention, the person may initiate an emergency situation by activating his/her pendant from anywhere in a facility in which the person resides. The possibility of encountering a busy signal when the speakerphone initiates a call may be eliminated. In addition, numerous response strategies may be implemented by the caregiver receiving the pendant signal, depending upon the capabilities of the receiver. For example, the caregiver may call the speakerphone associated with the pendant signal over a dedicated telephone line recognized by the speakerphone and open up a hands-free voice channel with the speakerphone. Other such strategies may be provided without departing from the scope of the invention.

Figure 1:
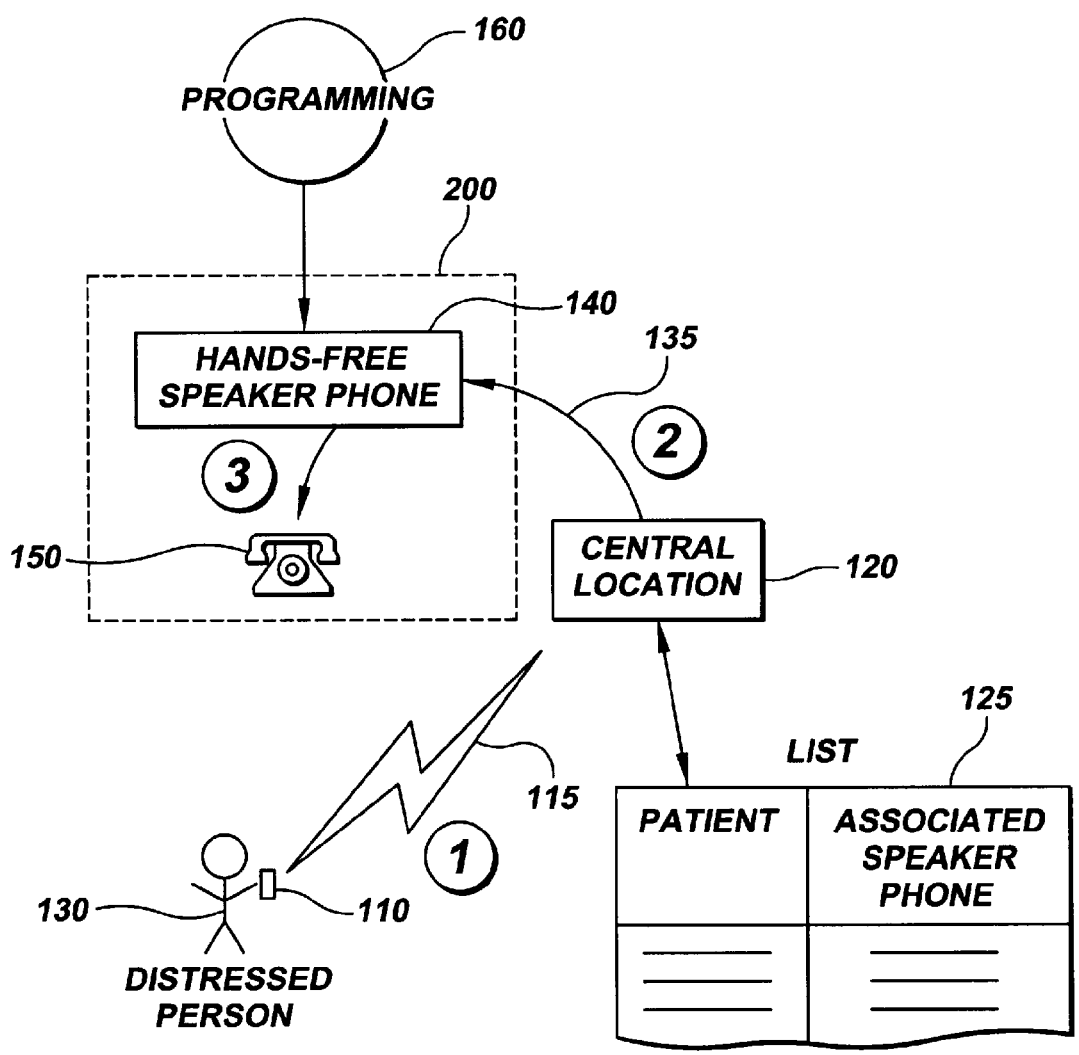
FIG. 1 shows a schematic diagram depicting a general system for initiating and responding to an emergency signal, according to an embodiment of the invention.

Referring now to FIG. 1, a schematic diagram is shown to illustrate a call-to-help system according to an embodiment of the inventive system and method for responding to emergency situations. The system shown may allow a person 130 to call for assistance by activating a pendant 110 that the person 130 carries about on his body. The person 130 may also have a speakerphone system 200 installed in reasonably close proximity with the person 130. For example, the speakerphone system 200 may be set up in a bedroom of the residence of the person 130 when the person may be confined to a bed or unable to move about freely. A central location 120 may be established as a clearinghouse to detect when the person 130 has need of care by receiving a signal 115 from the pendant 110 and activating the appropriate speakerphone system 200 for interaction with the person 130.

The pendant 110 may contain a means for sending the signal 115 to the central location 120, which may be a central computer or a main desk of a communal facility. The signal 115 may contain an identifier to indicate which person 130 sent the signal 115. The person 130 may activate the pendant 110 by pressing a button, engaging a switch, and the like, to intentionally send the signal 115 to the central location 120. The signal 115 may be generated by the pendant 110 according to any wireless electronic means known to the art, such as by radio frequency (RF), ultra high frequency (UHF), and the like, without departing from the scope of the invention. The signal 115 may be formatted according to standard messaging protocols well known in the art and thus may contain the numeric identifier that may be assigned to the pendant 110 and person 130, in order to distinguish them from other pendant/person assignments. A list 125 of such assignments may be maintained at the central location 120 by standard methods, such as a paper roster or a file kept on a computer.

When the signal 115 is received at the central location 120, the signal 115 may be parsed to obtain the identifier. Based on the identifier, a telephone number of the speakerphone system 200 associated with the identifier may be obtained from the list 125. A telephone call may then be placed to the speakerphone system 200 on a dedicated line having a known caller identification (ID) number. The same dedicated line may be used for all such responsive telephone calls made from the central location 120. The telephone call may be placed either manually, as by an attendant at the central location 120 dialing the person's number on the dedicated line, or automatically, as by a computer automatically looking up the telephone number on the list 125 and dialing the person's telephone number on the dedicated line. Other methods may combine the manual and automated methods, i.e. a computer receiving the signal, determining the person's associated speakerphone system 200 number, and presenting it on a computer screen so that the attendant could manually dial the number. Other variations of these methods may also be used without departing from the scope of the invention.

When the speakerphone system 200 receives the telephone call, the speakerphone system 200 may recognize the call as being from the dedicated line, go off-hook, and activate a speaker 150 so that the person 130 can talk with the attendant or a caregiver at the central location 120. The speaker 150 as defined herein may necessarily have the capability to broadcast an audio signal received from the telephone line and to receive audible speech made by the person, i.e. it may contain both a speaker and a microphone. Different options may be programmed into the speakerphone system 200 by a programming means 160 as part of a configuration procedure when the speakerphone system 200 is set up. The programming means 160 may be used periodically to change options, in order to more conveniently conform to the person's desires. Such a programming means 160 may be implemented as a download capability from a computer at the central location 120 or a manual setup from an onsite technician. Other methods of configuring the speakerphone system 200 may also be contemplated.

The inventive system relies on a Calling Number Delivery capability of the commercial telephone systems, better known as "Caller ID". This capability is a telephone service intended for residential and small business customers, which allows the called customer premises equipment to receive, in the form of an ASCII character string, a calling party's directory number and the date and time of the call. This character string is sent by the commercial telephone switch during the first four second silent interval in the ringing cycle at a baud rate of 1200 characters per second. The protocol for the ASCII character string is shown in FIGS. 2 and 3.

Figure 2:
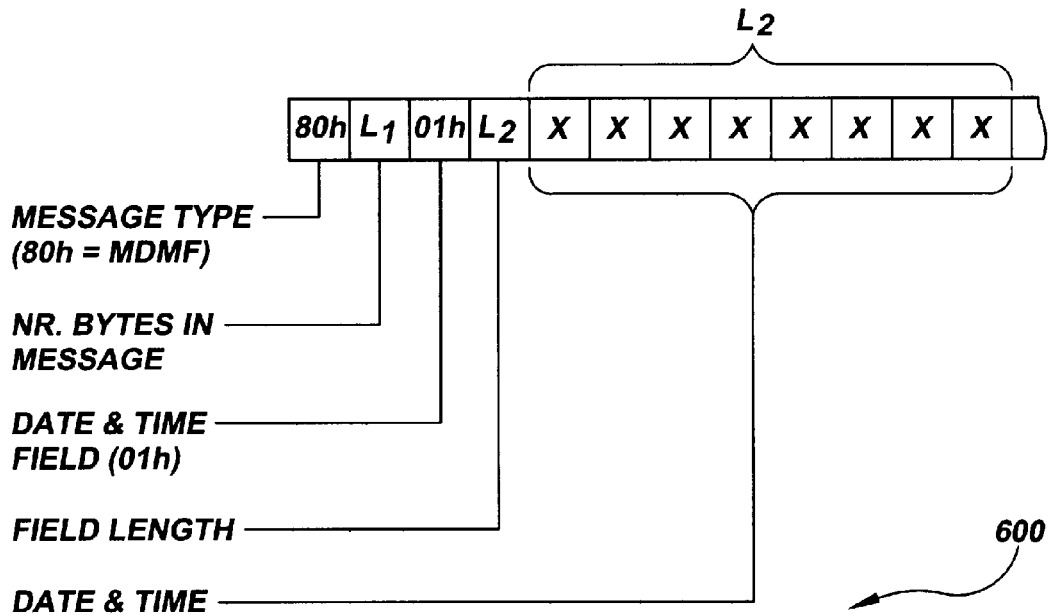
FIG. 2 shows a diagram of a SDMF message for Caller Identification from which a caller's telephone number may be digitally obtained, according to an embodiment of the invention.
Figure 2:
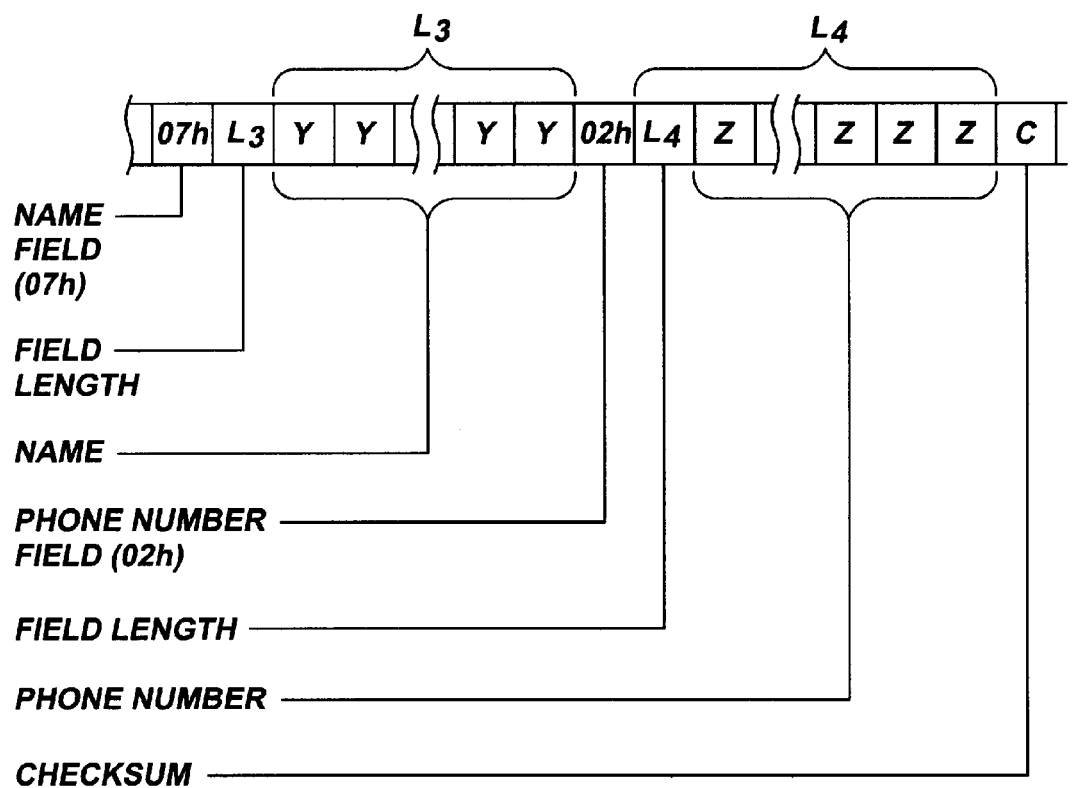
Figure 3:
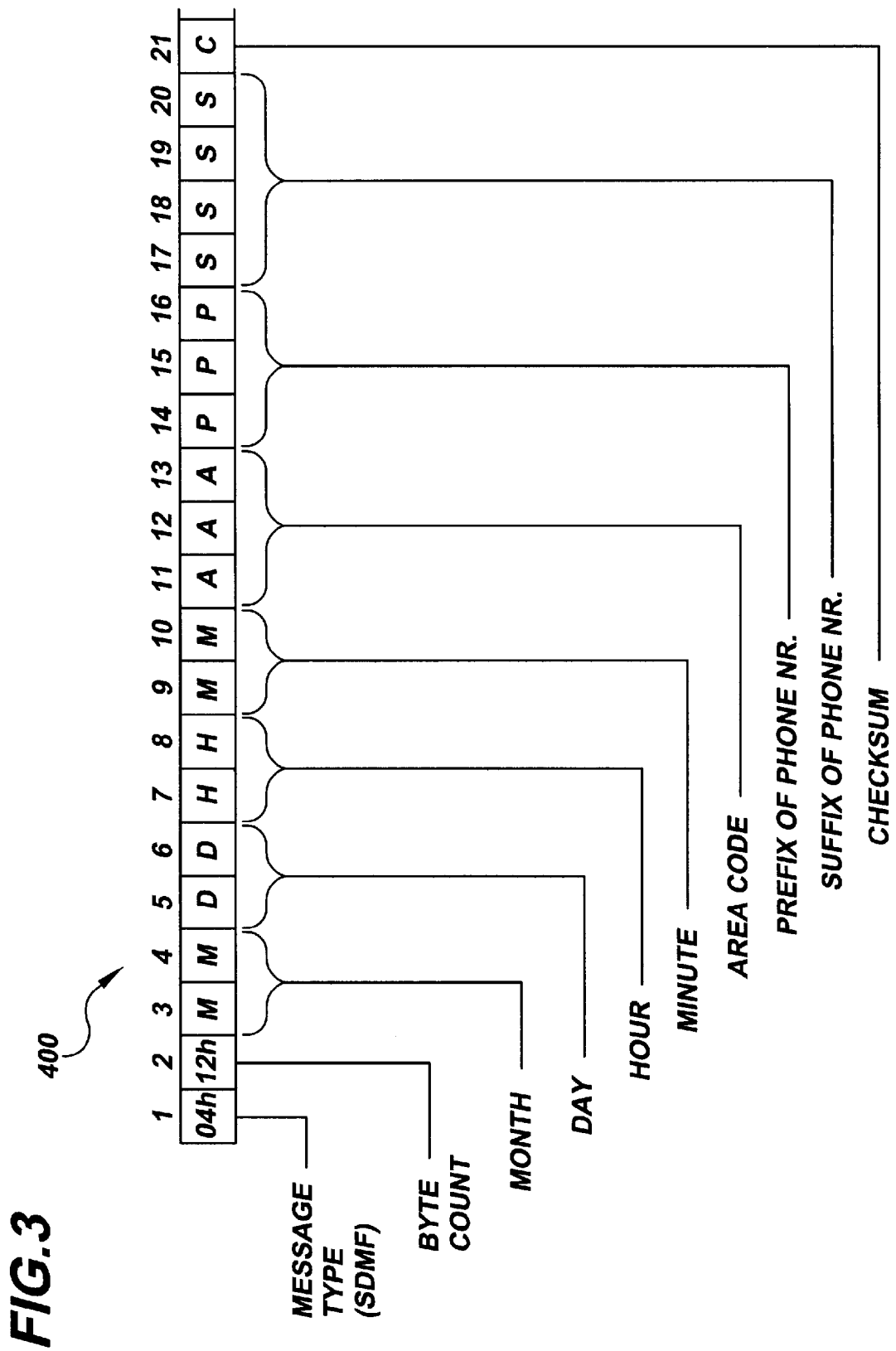
FIG. 3 shows a diagram of a MDMF message for Caller Identification from which a caller's name or telephone number may be digitally obtained, according to an embodiment of the invention.

According to FIGS. 2 and 3, this ASCII character string may have two different formats, the single data message format (SDMF; FIG. 2) and the multiple data message format (MDMF; FIG. 3). The data contained in each message type are divided into fields that are preceded by an ASCII character containing a binary number representing the byte count of the subsequent field. SDMF supports a single data type and is used to send date & time and telephone number information only; MDMF supports multiple data types and is used to send date & time, name, and telephone number information.

SDMF messages have a single field, the date & time and phone number fields, whereas the MDMF messages may contain separate fields for different data fields, e.g. date & time, name, phone number, etc. The first byte of the ASCII character string may contain a code indicating the message type, i.e. 04h=SDMF and 08h=MDMF. After that a field (SDMF) or a multiple of fields (MDMF) may be received. SDMF supports a single field type so that there is no requirement for a field type byte. The SDMF field is formatted as a binary character count (one byte) followed by a month code (two byes), day code (two bytes), hour code (two bytes), minute code (2 bytes), area code (3 bytes), prefix (3 bytes), and suffix (4 bytes), for a total of 18 bytes (12h) for the character count. Finally a checksum byte is sent, where the checksum byte contains the two's complement of the modulo 256 sum of the other bytes in the message, i.e. message type, message length, and data bytes.

For MDMF messages, the first byte of the ASCII character string may contain a code indicating the message type, i.e. 08h=MDMF, followed by a binary message length byte. After that, a series of fields may be received. MDMF supports field types for a date & time field (01h), a name field (07h), and a phone number field (02h). Other fields may be supported but they are not described here. Each field consists of a field type character followed by a binary field length character and a series of ASCII characters comprising the data in the field. Finally a checksum byte is sent.

Figure 4:
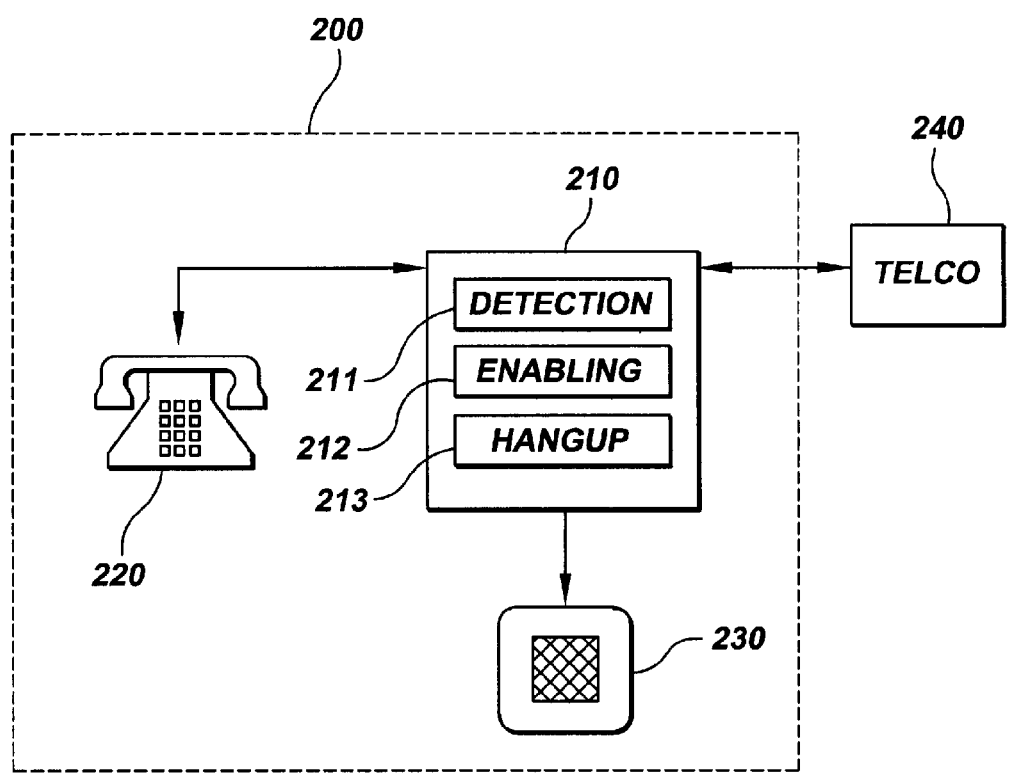
FIG. 4 shows a hands-free speakerphone system with its components, according to an embodiment of the invention.

Referring now to FIG. 4, a speakerphone system 200 may be provided by the invention to support two-way conversation between a person having an emergency and a caregiver. The speakerphone system 200 may have a telephone receiver 220 for enabling the two-way conversation to take place, a speaker 230 for hands-free use of the speakerphone system 200, and a control module 210 that controls the functions of the speakerphone system 200. An incoming telephone signal may be provided to the speakerphone system 200 from a switched telephone network 240. The incoming telephone signal may contain a Caller ID portion.

The control module 210 receive the incoming telephone signal and process the signal to provide functionality to the speakerphone system 200. The control module 210 may provide may provide a caller detection capability 211, an enabling capability 212, and a hangup capability 213. These capabilities may be implemented through the use of hardware components, software components, or some combination of hardware and software components. The control module 210 may contain the identity of a dedicated caller identification that is to be recognized by the speakerphone system 200 as originating from an emergency caregiver and necessitating the activation of the capabilities of the speakerphone system 200. This identity may be provided to the speakerphone system 200 by appropriate methods known to the art. For example, the control module 210 may have a port into which a portable laptop computer or some other computing device may be attached to provide the identity through the programming capability 160 described previously. The identity may also be provided by entering an appropriate sequence of DTMF tones that would cause the control module 210 to accept subsequent DTMF tones as being the identity. Another way of providing the identity may be to incorporate jumper pins or thumb wheels to manually provide the identity. Other methods of providing the identity to the control module 210 may be used as well, without departing from the scope of the invention.

When a telephone call is received by the speakerphone system 200, the control module 210 through its caller detection capability 211 may examine the Caller ID portion of the incoming signal to determine whether or not it is from the dedicated phone line. Each incoming telephone signal is routinely accompanied by a caller identification signal containing a unique code identifying the incoming call. The caller detection capability 211 may compare this incoming caller identification signal with the identity provided to the control module 210 by special programming (see above); if the values of the identity and the caller identification do not match, the caller detection capability 211 may allow the call to activate the functions of the telephone receiver 220 in the standard fashion. If the values of the identity and the caller identification do match, then the enabling capability 212 may be responsively invoked.

The enabling capability 212 may cause the telephone signal to be sent to the speaker 230 and a pickup signal to be returned to the caller to initiate two-way hands-free communication. Optionally, a delay between the time the telephone call was received and the issuance of the pickup signal may be established. The duration of the delay may be determined through programming by one or the previously-described methods for receiving the identity or by some other convenient means known to the art. The enabling capability 212 may also provide an indicator tone through the speaker 230 before sending the pickup signal, in order to alert persons in the vicinity of the speakerphone system 200 that a telephone call was received and that the speaker 230 is "live".

The hangup capability 213 may be provided as a method of terminating the telephone call without manual intervention on the part of the receiving person. This hangup capability 213 may be implemented by a number of methods. One method may be to provide a timeout function that counts down a selected number of seconds from the last time a voice or sound was detected by the speakerphone system 200. A sound of any kind may cause the timeout function to be reset. The value of the duration may be programmed according to any of the previously described methods of programming the speakerphone system 200. Another method may be for the caller to send a specific DTMF sequence that would serve as code which, when received by the speakerphone system 200, would cause the speakerphone system 200 to disconnect from the line. Another method may be to detect when the caller has hung up and subsequently deactivate the speakerphone system 200. In still another method, the hangup may be initiated after a fixed duration after the speakerphone system 200 answers the telephone call. Any one or combination of these methods may be implemented to provide the hangup capability without departing from the scope of the invention.

The speakerphone system 200 may also be provided with one or more indicators that reflect the current state of the speakerphone system 200. For example, it may have a series of indicators, such as light-emitting diodes (LEDs) that illuminate under control of the control module 210 according to operational conditions. One LED may be turned on when the speakerphone system 200 responds to a call from the dedicated telephone line, one LED may be turned on whenever the speakerphone system 200 has power applied to it, and so forth. Colored LEDs may also be creatively employed in this capacity.

A method by be provided by the invention to implement a call-for-help capability, as shown in the flowchart 500 of FIG. 5. The method may provide a central location 120 that may be configured to receive emergency signals sent by one or more persons for assistance. Each person may be provided with a pendent, according to the block labeled 510. The pendent may contain a wireless transmitter configured for manual activation by the person when the person requires assistance and for transmission of a signal containing an identifier assigned to the person. The person may also be provided with a speakerphone system according to the block labeled 520, the speakerphone system having a telephone number assigned to the person, a telephone receiver, a speaker, and a control module that controls the speakerphone system. It may be located in a location where the person may be generally found, such as a bedroom of the person's residence or other similar location. When the person requires assistance, the person may activate the pendent to send the signal, according to the block labeled 530. Activation of the pendent may be volitional on the part of the person, requiring the person to deliberately activate the pendent. The signal may then be received at a central location, according to the block labeled as 540.

The central location may be capable of receiving signals from one or more persons that have been so equipped and responding to the request for assistance indicated thereby. Upon receiving the signal at the central location, the the telephone number of the speakerphone system associated with the person may be determined, according to the block labeled 550. Such determination may be made by examining the identifier contained in the signal and obtaining from a list of known telephone numbers the telephone number corresponding to the identifier. This determination may be done automatically or manually, without departing from the scope of the invention. In one embodiment, automatic determination may be performed by receiving the signal through a computer means, extracting the identifier, and performing a lookup in a table by programmatic means to obtain the associated telephone number. In another embodiment, manual determination may be performed by decoding the signal by electronic means to display the identifier contained therein, and then requiring the attendant to find the identifier on a paper list having a telephone number for each identifier on the list.

Upon determining the telephone number of the speakerphone system associated with the person who generated the signal, a telephone call may be initiated to the speakerphone system from a telephone channel having a specified caller identification, according to the block labeled 560. This dedicated telephone channel may be established as part of the system corresponding to the method, and its unique caller identification number may be made known to each speakerphone system within the overall system. As before, this step may be performed from the central location either automatically by computer means or manually by means of the attendant.

According to the block labeled 570, the telephone call with the specified caller ID from the central location may be received by the speakerphone system. The phone number in the caller identification message from the telephone call may then be examined by the control module of the speakerphone system upon ringing in, according to the block labeled 580. If the control module determines that the caller identification of the received telephone call is equal to the specified caller identification (block 590), then the control module of the speaker phone system may automatically perform two actions. First, the control module may place the telephone receiver of the speakerphone system offhook, according to the block labeled 592. Second, the control module may automatically redirect the telephone call to the speaker, according to the block labeled 594, so that a two-way, audible voice path between the speaker of the speakerphone system and the attendant is established. In this way, the person may not be required to manually activate the system when the caller is the attendant. Otherwise, the control module may allow the telephone receiver of the speakerphone system to ring until the person manually places the telephone receiver offhook, according to the block labeled 596. In this way normal, non-emergency calls may be received without disturbing the person's privacy.

Note that the caller identification may be established by comparing either the phone number contained in the caller identification message with a selected telephone number, or by comparing the name in the caller identification message with a selected name. Either method of identification may be used without departing from the scope of the invention, with the number identification method being preferred.

As can be seen, the invention provides a system and a method for providing emergency care to a person that may not be able to initiate a telephone call, by automatically receiving a telephone call from a known source. As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer usable storage media (including, but not limited to, disk storage, CD-ROM, optical storage, and so forth) having computer usable program code embodied therein.

It should be understood, of course, that the foregoing relates to exemplary embodiments of the invention and that modifications may be made without departing from the spirit and scope of the invention as set forth in the following claims. While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

From the foregoing, it will be understood by persons skilled in the art that a method for responding to an emergency signal has been provided. The invention is relatively simple and easy to manufacture, yet affords a variety of uses. While the description contains many specifics, these should not be construed as limitations on the scope of the invention, but rather as an exemplification of the preferred embodiments thereof. The foregoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

We claim:

1. A method for processing emergency calls made by a person to a central location with an attendant, the method comprising the steps of providing a pendent to the person, the pendent comprising a wireless transmitter responsively sending a signal directed to the central location when the pendent is activated by the person, the signal containing an identifier for the person;

providing the person with a speakerphone system having a telephone number, a telephone receiver, a speaker, and a control module, the speakerphone system installed in the general proximity of the person, the speakerphone system responsive to a specified caller identification received on a telephone channel;

activating the pendent by the person to send the signal;

receiving the signal at the central location;

determining at the central location, in response to the identifier contained in the signal, the telephone number of the speakerphone system;

initiating a telephone call to the speakerphone system from a telephone channel having the specified caller identification;

receiving the telephone call with the specified caller identification by the speakerphone system;

examining the caller identification of the telephone call by the speakerphone system;

if the caller identification is equal to the specified caller identification, then in response:

placing offhook the telephone receiver of the speakerphone system, and directing the telephone call to a speaker, wherein a two-way, audible voice path between the speaker of the speakerphone system and the attendant is established;

otherwise, allowing the telephone receiver of the speakerphone system to ring until the person manually places the telephone receiver offhook.

2. The method described in claim 1, further comprising the step of causing an audible tone to be generated when the two-way audible voice path is opened.

3. The method described in claim 1, further comprising the steps of maintaining a list of telephone numbers on a central computer at the central location, wherein each telephone number is associated with an identifier and a speakerphone system; and selecting the telephone number associated with the identifier contained in the signal.

4. The method described in claim 1, wherein the speakerphone system has a plurality of caller identification values.

5. The method described in claim 1, wherein the steps executed when the caller identification is equal to the specified caller identification include the following step:

terminating the telephone call when a timeout function that counts down a selected number of seconds from the last time a voice or sound was detected by the speakerphone system and resetting the timeout function when a sound is detected by the speakerphone system.

6. The method described in claim 1, wherein the steps executed when the caller identification is equal to the specified caller identification include the following step:

terminating the telephone call when the caller to sends a specific DTMF sequence serving as code that, when received by the speakerphone system, causes the speakerphone system to disconnect from the telephone line.

7. The method described in claim 1, wherein the steps executed when the caller identification is equal to the specified caller identification include the following step:

terminating the telephone call when the speakerphone system detects that the caller has hung up.

8. The method described in claim 1, wherein the steps executed when the caller identification is equal to the specified caller identification include the following step:

terminating the telephone call after a fixed duration after the speakerphone system answers the telephone call.

9. The method described in claim 1, wherein the specified caller identification is a caller telephone number and the caller identification is made on the basis of a comparison between the phone number of the caller identification message and the caller telephone number.

10. The method described in claim 1, wherein the specified caller identification is a caller name and the caller identification is made on the basis of a comparison between a name field of the caller identification message and a selected caller name.

11. The system described in claim 9, the control module having a function of detecting the selected caller telephone number, wherein the control module compares the specified caller telephone number stored by the speakerphone system with the telephone number contained in the caller identification.

12. The system described in claim 9, the control module having an enabling function, wherein the control module issues an offhook signal if the specified caller telephone number stored by the speakerphone system is the same as the telephone number contained in the caller identification, the offhook signal activating the speaker for receiving a voice message.

13. The system described in claim 9, the control module having a hangup function, wherein the control module automatically terminates the telephone call.

14. A system for providing a call-for-help capability for a person having a need for assistance, the system comprising a pendant sized to be carried by the person, the pendant having a means to generate in response to a manual activation action by the person a signal containing an identifier, the identifier being associated with the person;

a specified caller telephone number having a caller identification;

a speakerphone system located in proximity to the person, the speakerphone system having a speakerphone telephone number, the speakerphone system comprising:

a telephone receiver providing the person a capability to place telephone calls from the speakerphone system;

a speaker supporting two-way, hands-free communication between the person and a third party; and a control module responding to a telephone call containing the specified caller identification;

a list associating the identifier with a speakerphone telephone number of the speakerphone; and a central location having a means to receive the signal and, in response, to;

obtain the identifier from the signal;

obtain the speakerphone telephone number associated with the identifier from the list; and initiate a telephone call to the speakerphone telephone number from the specified caller telephone number.

* * * * *